April 18, 1950     E. W. ZINGSHEIM     2,504,481
OVERRUNNING CLUTCH RELEASE MEANS Filed March 20, 1947     2 Sheets—Sheet 1

INVENTOR:
Edward W. Zingsheim,
BY
Bodell & Thompson
ATTORNEYS.

April 18, 1950      E. W. ZINGSHEIM      2,504,481
OVERRUNNING CLUTCH RELEASE MEANS
Filed March 20, 1947      2 Sheets-Sheet 2
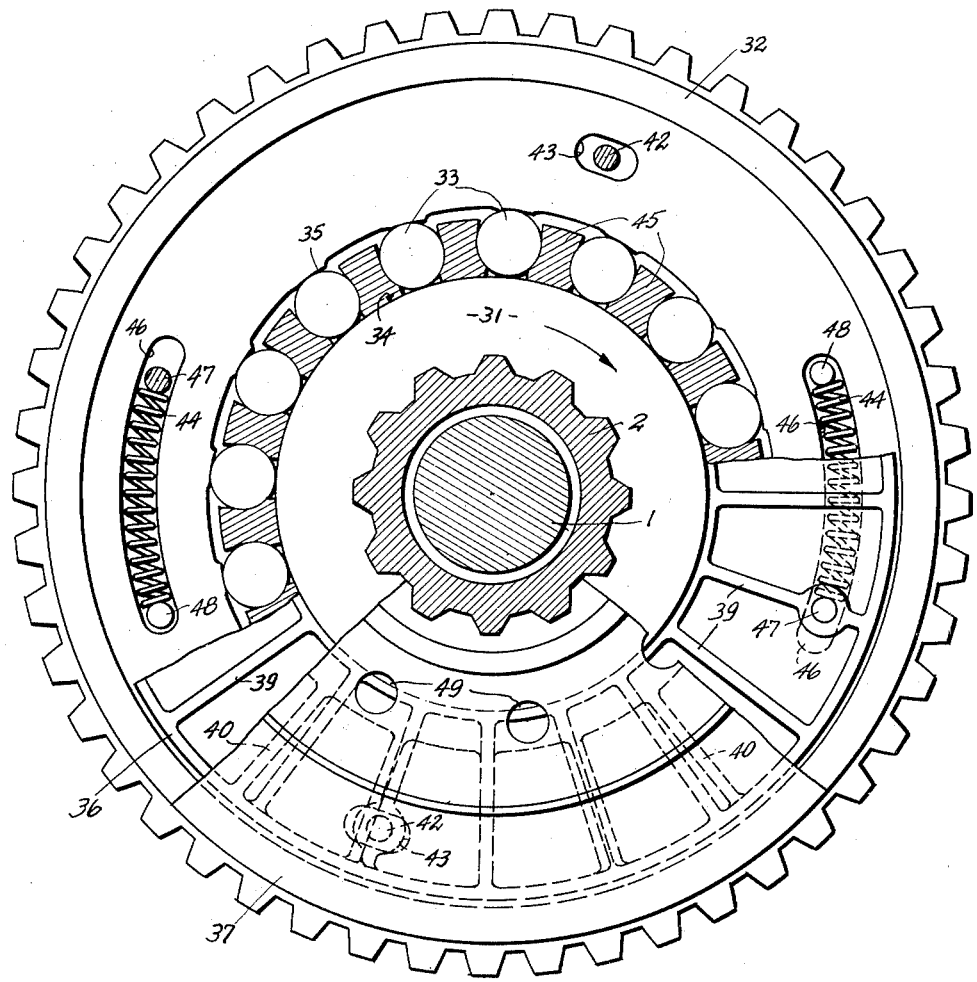
INVENTOR:
Edward W. Zingsheim,
BY
Bodell & Thompson
ATTORNEYS.

Patented Apr. 18, 1950

2,504,481

UNITED STATES PATENT OFFICE 2,504,481

OVERRUNNING CLUTCH RELEASE MEANS

Edward W. Zingsheim, Toledo, Ohio, assignor to Dana Corporation, Toledo, Ohio, a corporation of Virginia Application March 20, 1947, Serial No. 736,044

9 Claims. (Cl. 192—45)

This invention relates to overrunning clutches, and has for its object a release means for the clutch members thereof actuated by the overrunning race of the clutch when overrunning, to positively shift the clutch members out of clutching position. More specifically, it has for its object a release means including a hydraulic or turbine coupling including an impeller and runner enclosing a vortex chamber in which opposing vanes on the impeller and the runner are exposed, the impeller being rotatable with the race of the clutch capable of overrunning, and having a limited rocking movement relatively thereto, and the runner being rotatable with, or synchronously with, the other or drive race of the clutch, the rocking shifting movement of the impeller shifting the clutch members or rollers between the races of the clutch out of clutching position when the race capable of overrunning is overrunning.

The invention consists in the novel features and in the combinations and constructions hereinafter set forth and claimed.

In describing this invention, reference is had to the accompanying drawings in which like characters designate corresponding parts in all the views.

Figure 2 is a sectional view taken approximately on line 2—2, Figure 1, parts being broken away.

Figure 1:
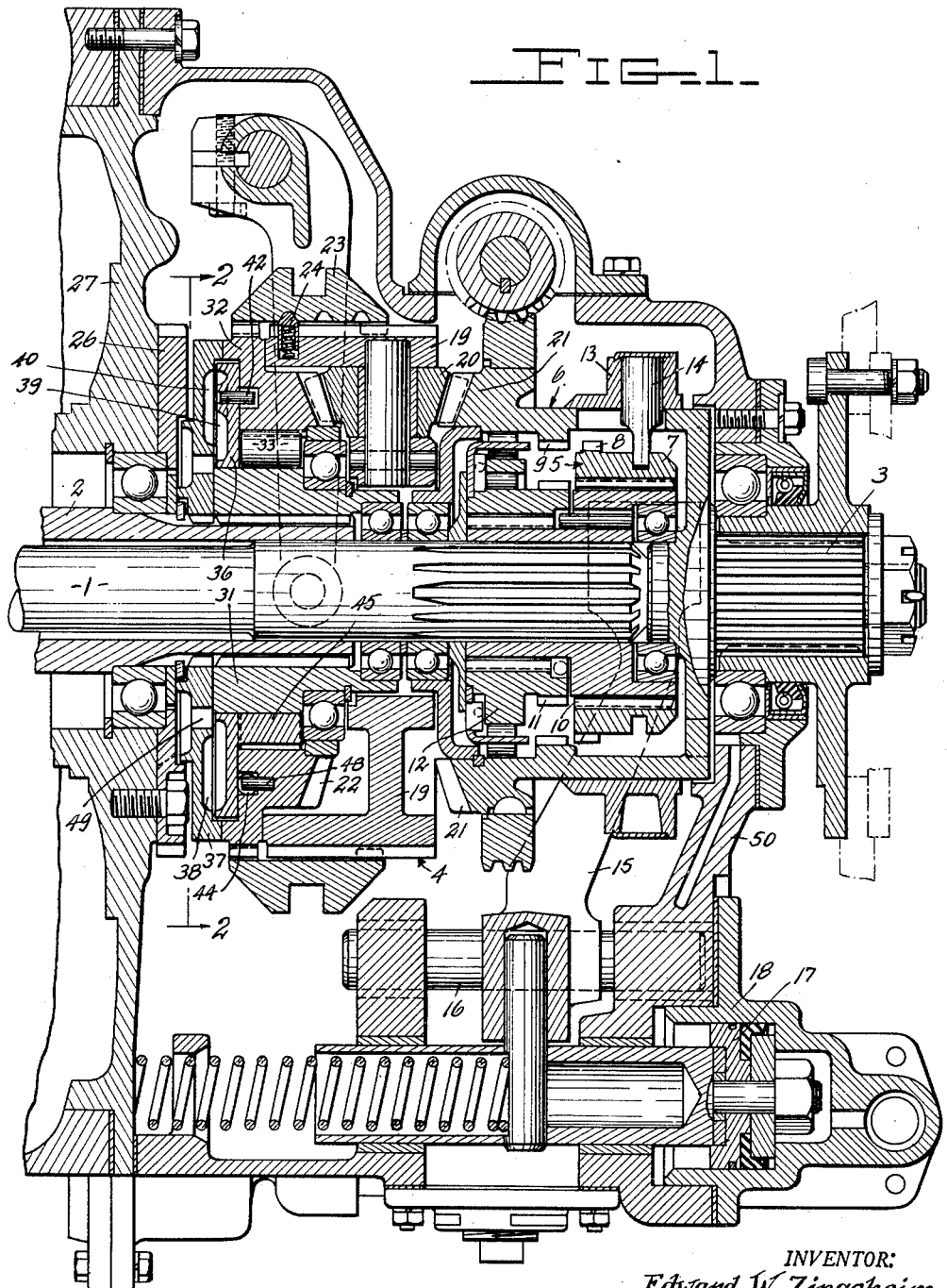
Figure 1 is a fragmentary, longitudinal, or axial sectional view, of a transmission mechanism embodying the overrunning clutch and its release means.

The invention is shown as embodied in a transmission gearing of the general type shown in Peterson et al. Patent No. 2,369,369, February 13, 1945, in which there are two engine actuated, concentrically arranged, drive shafts and a driven shaft alined therewith, one drive shaft being a direct or high speed shaft, and the other an indirect drive at lower speeds. The direct drive is connected to the driven shaft by a normally disengaged clutch which engages after the speed has been built up through the indirect drive to the high speed range. The indirect drive includes a hydraulic torque converter which is connected to the engine through a clutch which is disengaged when the transmission is in direct drive, so that the converter will be idle when the transmission is in direct drive. The indirect drive shaft is a sleeve around the direct drive shaft, and is the output shaft, or sleeve, of the runner or turbine of the converter.

The torque of the converter output is transmitted to the driven shaft, or to forward and reverse gearing between the converter and driven shaft, through an overrunning clutch which permits the driven shaft to overrun the turbine output shaft when the high speed direct drive clutch is engaged, at which time the converter is idle because unclutched from the engine. The overrunning clutch is usually a roller clutch. By roller is meant either cylindrical or spherical rolling members.

The invention relates to means actuated by the driven shaft, or driven member, or outer race of the clutch when the driven shaft is overrunning to positively shift the rollers, or the clutching members, out of clutching position. The overrunning clutch and release means includes driving and driven races and one way clutch members between them arranged to permit the driven race to overrun the drive race when the speed of the driven race is greater than that of the drive race, and release means actuated by the driven race, when rotating faster than the drive race to shift the clutching members out of clutching position. As the clutch members are usually rollers, spacing means are used. The spacing means are usually biased by a spring, or springs, to shift the clutch members, or rollers, into engaged position, and the release means acts in opposition to the springs.

The transmission unit, in which the overrunning clutch is shown as embodied, includes a direct drive, or high speed drive shaft 1, an indirect drive shaft 2, which is a sleeve concentric with the drive shaft 1, a driven shaft 3 axially alined with the shafts 1, 2, a forward and reverse gearing 4 between the indirect drive shaft 2 and the driven shaft 3, and a direct drive clutch 5 operable to clutch the direct drive shaft 1 directly to the driven shaft.

The driven shaft 3 is here shown as formed with a hollow cylindrical head 6, into which the end of the drive shaft 1 projects, and the direct drive clutch 5 is located within the hollow head and includes a collar, or clutch section, 7 shiftable axially relatively to the head and the shaft 1 to carry clutch teeth 8 thereon into clutching engagement with teeth 9 on the head, and also internal teeth 10 movable into clutching engagement with teeth 11 on a collar 12, or clutch section, splined to the drive shaft 1. Insofar as this invention is concerned, this clutch may be any clutch capable of transmitting full torque. It is usually of the balking type and insofar as function and general operation is concerned, it is the same as in the patent referred to.

The shiftable clutch collar 7 is shifted by power applied to a collar 13 slidable on the head and connected by pins 14 to the clutch member 7. The shift collar is connected by a fork 15 to a shift rod 16 actuated by a piston 17 working in a suitable cylinder 18 to which air is supplied in any suitable manner.

The forward and reverse gearing may be of any suitable construction. That here shown is of the planetary type and includes a planetary gear case 19 having radial spindles on which bevel pinions 20 are mounted, each pinion meshing with a ring gear 21 on the head 6, and with a bevel ring gear 22 on the driven race of the overrunning clutch. The forward and reverse mechanism has three positions. A forward position, as shown in Figure 1, an intermediate, neutral position, and a reverse position. These positions are determined by a shift collar 23 slidable on the case 19. The three positions are indicated by notches coacting with the poppet 24 on the case 19. The shift collar 23 has internal teeth suitably spaced to lock the driven race of the overrunning clutch thereto and to the case when in forward position when the poppet is in the position shown in Figure 1.

When the collar 23 is shifted to the left, so that the poppet 24 is in the intermediate notch, the gearing is in neutral and during rotation, the pinions merely rotate planetarily, rolling over the ring gear 21 on the head 6. When the collar 23 is shifted farther, as to the left, Figure 1, and the poppet 24 is in the third, or right hand notch, the teeth of the collar interlock with the teeth of a stationary clutch member 26 fixed to the wall 27 of the stationary housing for the converter. When engaged with the stationary clutch member 26, the teeth of the clutch collar are also interlocked with the case 19, so that the case 19 is held from rotation and the pinions 20 are held from planetary action, but are rotated by the driven race of the clutch about their own axes, transmitting reverse movement to the driven shaft 3, or the head 6 thereof. This gearing forms no part of the invention and any suitable gearing may be substituted therefor.

The numerals 31 and 32 designate the inner drive and outer driven races of the overrunning clutch, and 33 the rollers between them. The drive race 31 is splined to the driven shaft 2, that is, the output sleeve of the converter and it is here shown as provided with a smooth or cylindrical surface 34, Figure 2, on which the rollers run. The outer race 32 is splined to, or interlocked with, the internal teeth of the shifting collar 23 when in the forward speed position, Figure 1. The inner annular face of the outer or driven race 32 is formed with cams 35, Figure 2.

The release means for positively disengaging, or unwedging, the rollers from the cams 35 when the outer race 32 overruns, includes a hydraulic coupling device having an impeller 36 and a runner 37, the impeller 36 being discoidal and lying alongside one side of the outer race 32 and rotatable with the outer race 32, and also having a limited rocking movement relatively thereto. The runner 37 is also discoidal and is mounted on the sleeve or shaft 2 to rotate with the inner driving race 31, and to also lie flatwise, or face to face, against the face of the impeller. The impeller and runner are formed with a vortex chamber 38 between them, and are provided respectively with opposing vanes 39 and 40 exposed in said chamber. The relative rocking movement of the impeller 36 and the driven race 32 is limited by pins 42 on one side of the impeller extending into slots 43 in the outer driven race 32.

Means for spacing the rollers in the raceways is here shown as a unit with the impeller 36 and, as here shown, are laterally extending projections 45 on the impeller, these projections extending into the raceway. The springs for biasing the spacing means, or the impeller unitary therewith in such direction as to tend to carry the rollers in the direction of rotation up onto the cams, or wedge the rollers between the cams and the periphery of the inner drive race 31, are here shown as two coiled springs 44 located in grooves, or slots, 46 between abutment pins 47 and 48 on the impeller and on the outer race 32 respectively. The runner 37 has inlets 49 for oil. The oil is supplied from a sump in the casing 50 for the forward and reverse mechanism and direct drive clutch, etc., which casing is secured to the wall 27 of the housing of the hydraulic converter, the oil being filled to a level so high that it will be splashed into the runner through the openings 49, or is thrown into a trough from which it can run into the openings 49. The drive and driven shafts are suitably journalled in this casing, and the bearings therefor are located in any suitable manner.

In operation, with the forward and reverse gearing in forward speed, as shown in Figure 1, the speed is built up through the indirect drive, this drive, being through the overrunning clutch, consisting of the inner and outer races 31, 32, and interposed rollers 33. When the speed is built up to direct drive range, the clutch 5 is shifted into engaged position and then, the drive shaft 1 rotates faster than the drive shaft 2. That is, faster than the indirect drive, particularly when the clutch controlling the actuation of the converter is thrown out, as in the patent referred to. When in high speed, or direct drive, the outer driven race 32 of the overrunning clutch overruns the runner 37, the impeller 36 creates a vortex through the runner 37, and the oil reacts back into the impeller, causing it to rock relatively to the outer race 32 against the action of the springs 44, causing the impeller to actuate the spacing projections 45 in a direction opposite to the direction of rotation, thus positively shifting the rollers out of wedging position with the cams 35. When out of wedging position, the centrifugal force throws the rollers outward away from the smooth surface of the inner driving cam 31 so that there is no undue wear on the rollers, or the races, and no jamming of the rollers on the cams, or on the smooth face of the inner race 31. Hence, there is a complete release of the overrunning clutch when in direct drive, and no force is transferred back from the driven shaft 3, or its head 6, to the runner of the idle converter.

What I claim is:

1. An overrunning clutch and release coupling including opposing driving and driven races and clutching members between them, the clutching members being arranged to permit the driven race to overrun when the speed of the driven race is greater than that of the drive race, and release means actuated by the driven race when rotating faster than the drive race to shift the clutching members out of clutching position, the release means including two coupling members rotatable respectively with the driven race and the clutching members, the clutching members coacting with the driven race to have an orbital shifting movement within limits, and operable by the coupling to shift retrogradely, with respect to the direction of rotation, out of clutching position when the driven race is rotating faster than the drive race.

2. An overrunning clutch and release coupling including opposing driving and driven races and clutching members between them, the clutching members being arranged to permit the driven race to overrun when the speed of the driven race is greater than that of the drive race, and release means actuated by the driven race when rotating faster than the drive race to shift the clutching members out of clutching position, said release means including a hydraulic coupling embodying an impeller coaxial and rotatable with the driven race and having a limited rocking movement relatively thereto, and a runner rotatable with the drive race, the impeller and the runner enclosing a vortex chamber for a fluid between them, and having opposing vanes in said chamber, the impeller and runner being located so that the reaction of the fluid in the vortex chamber on the impeller shifts the clutching means in a retrograde direction relative to the direction of rotation when the driven race is rotating faster than the drive race.

3. A roller overrunning clutch and release coupling including opposing driving and driven races and rollers between them, the rollers being arranged to permit the driven race to overrun when the speed of the driven race is greater than that of the drive race, spacing means for the rollers, and roller release means actuated by the driven race when rotating faster than the drive race to shift the spacing means to carry the rollers out of clutching position, the roller release means comprising coacting coupling members rotatable respectively with the driven race and the spacing means for the rollers, the spacing means being connected to the driven race to have a limited orbital rocking movement, and operable by the coupling to shift in a retrograde direction relatively to the direction of rotation when the driven race is rotating faster than the drive race.

4. A roller overrunning clutch and release coupling including opposing driving and driven races and rollers between them, the rollers being arranged to permit the driven race to overrun when the speed of the driven race is greater than that of the drive race, spacing means for the rollers, and roller release means actuated by the driven race when rotating faster than the drive race to shift the spacing means to carry the rollers out of clutching position, said release means including a hydraulic coupling embodying an impeller coaxial and rotatable with the driven race and having a limited rocking movement relatively thereto, and a runner rotatable with the drive race, the impeller and the runner enclosing a vortex chamber for a fluid between them, and having opposing vanes in said chamber, the impeller and runner being located so that the reaction of the fluid in the vortex chamber on the impeller shifts the roller spacing means in a retrograde direction relative to the direction of rotation.

5. A roller overrunning clutch and release coupling including opposing driving and driven races and rollers between them, the rollers being arranged to permit the driven race to overrun when the speed of the driven race is greater than that of the drive race, spacing means for the rollers, and roller release means actuated by the driven race when rotating faster than the drive race to shift the spacing means to carry the rollers out of clutching position, said release means including a hydraulic coupling embodying an impeller coaxial and rotatable with the driven race and having a limited rocking movement relatively thereto and a runner rotatable with the drive race, spring means acting on the impeller and tending to rock it in the direction of rotation, the impeller and the runner enclosing a vortex chamber for a fluid between them, and having opposing vanes in said chamber, the impeller and runner being located so that the reaction of the fluid in the vortex chamber on the impeller shifts it and the roller spacing means in a retrograde direction relative to the direction of rotation.

6. A roller overrunning clutch and release coupling including opposing driving and driven races and rollers between them, the rollers being arranged to permit the driven race to overrun when the speed of the driven race is greater than that of the drive race, spacing means for the rollers, and roller release means actuated by the driven race when rotating faster than the drive race to shift the spacing means to carry the rollers out of clutching position, said release means including a hydraulic coupling including an impeller rotatable with the driven race and having a limited rocking movement relatively thereto, and a runner rotatable with the drive race, the impeller and runner enclosing a vortex chamber for a fluid between them, and having opposing vanes in said chamber, the roller spacing means being unitary with the impeller, and the impeller and runner being located so that the reaction of the fluid in the vortex chamber on the impeller shifts the impeller in a retrograde direction relative to the direction of rotation.

7. A roller overrunning clutch and release coupling including an inner driving race, an outer driven race, and rollers between them, one race having a comparatively smooth surface for the rollers, and the other being provided with cams arranged to permit the driven race to overrun when the speed of the driven race is greater than that of the drive race, spacing means for the rollers, and roller release means actuated by the driven race when rotating faster than the drive race to shift the rollers out of clutching position, the roller release means comprising coupling members rotatable respectively with the driven race and the roller spacing means, the spacing means being connected to the driven race to have a limited orbital rocking movement, and operable by the coupling to shift in a retrograde direction relatively to the direction of rotation when the driven race rotates faster than the drive race.

8. A roller overrunning clutch and release coupling including an inner driving race, an outer driven race, and rollers between them, the inner race having a comparatively smooth surface for the rollers, and the outer race being provided with cams arranged to permit the driven race to overrun when the speed of the driven race is greater than that of the drive race, spacing means for the rollers, and roller release means actuated by the driven race when rotating faster than the drive race to shift the rollers out of clutching position, said release means including a hydraulic coupling embodying an impeller coaxial and rotatable with the outer driven race and having a limited rocking movement relatively thereto, and a runner rotatable with the drive race, the spacing means being formed on the impeller, and the impeller and runner enclosing a vortex chamber for a fluid between them and having opposing vanes in said chamber, the impeller and runner being located so that the reaction of the fluid in the vortex chamber on the impeller shifts the impeller in a retrograde direction relatively to the direction of rotation when the outer driven race is rotating faster than the inner drive race, the inner drive race being formed with a smooth surface coacting with the rollers, and the outer driven race being provided with cams coacting with the rollers.

9. A roller overrunning clutch and release coupling including an inner driving race, an outer driven race, and rollers between them, the inner race having a comparatively smooth surface for the rollers, and the outer race being provided with cams arranged to permit the driven race to overrrun when the speed of the driven race is greater than that of the drive race, spacing means for the rollers, and roller release means actuated by the driven race when rotating faster than the drive race to shift the rollers out of clutching position, said release means including a hydraulic coupling embodying an impeller coaxial and rotatable with the outer driven race and having a limited rocking movement relatively thereto, and a runner rotatable with the drive race, the spacing means being unitary with the impeller, and the impeller and runner enclosing a vortex chamber for a fluid between them and having opposing vanes in said chamber, the impeller and runner being located so that the reaction of the fluid in the vortex chamber on the impeller shifts the impeller in a retrograde direction relatively to the direction of rotation when the outer driven race is rotating faster than the inner drive race, and spring means acting on the impeller tending to shift it and the spacing means in the direction of rotation.

EDWARD W. ZINGSHEIM.

REFERENCES CITED

The following references are of record in the file of this patent:

UNITED STATES PATENTS

| Number | Name | Date |
|---|---|---|
| 2,019,745 | Swennes | Nov. 5, 1935 |
| 2,068,773 | Slider | Jan. 26, 1937 |
| 2,232,090 | Anderson | Feb. 18, 1941 |
| 2,242,276 | Vincent | May 20, 1941 |
| 2,381,786 | Tyler | Aug. 7, 1945 |